Figure 1:
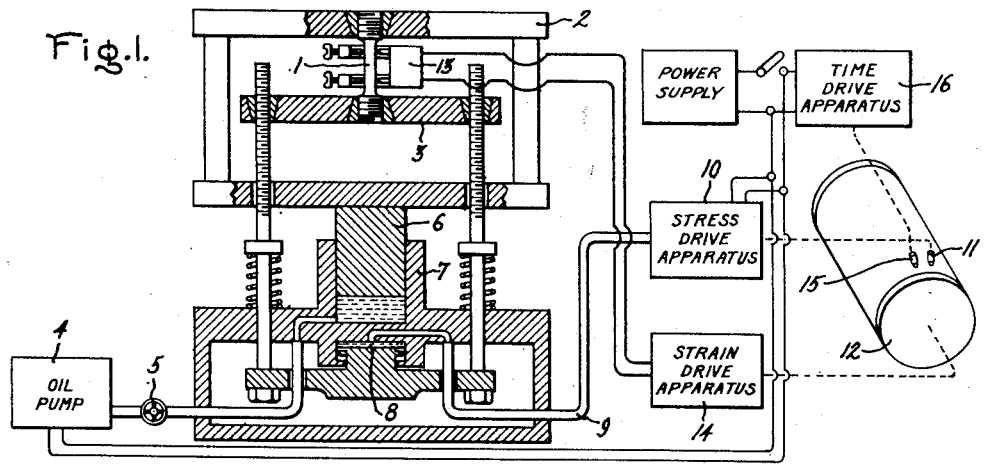

Nov. 17, 1953  J. D. LUBAHN  2,659,232
APPARATUS FOR MAKING STRESS-STRAIN TESTS
Filed May 27, 1949  8 Sheets-Sheet 1

Inventor:
Jack D. Lubahn,
by Richard E. Hosley
His Attorney.

Nov. 17, 1953          J. D. LUBAHN          2,659,232

APPARATUS FOR MAKING STRESS-STRAIN TESTS

Filed May 27, 1949          8 Sheets-Sheet 2

Inventor:
Jack D. Lubahn,
by   Richard E. Horley
His Attorney.

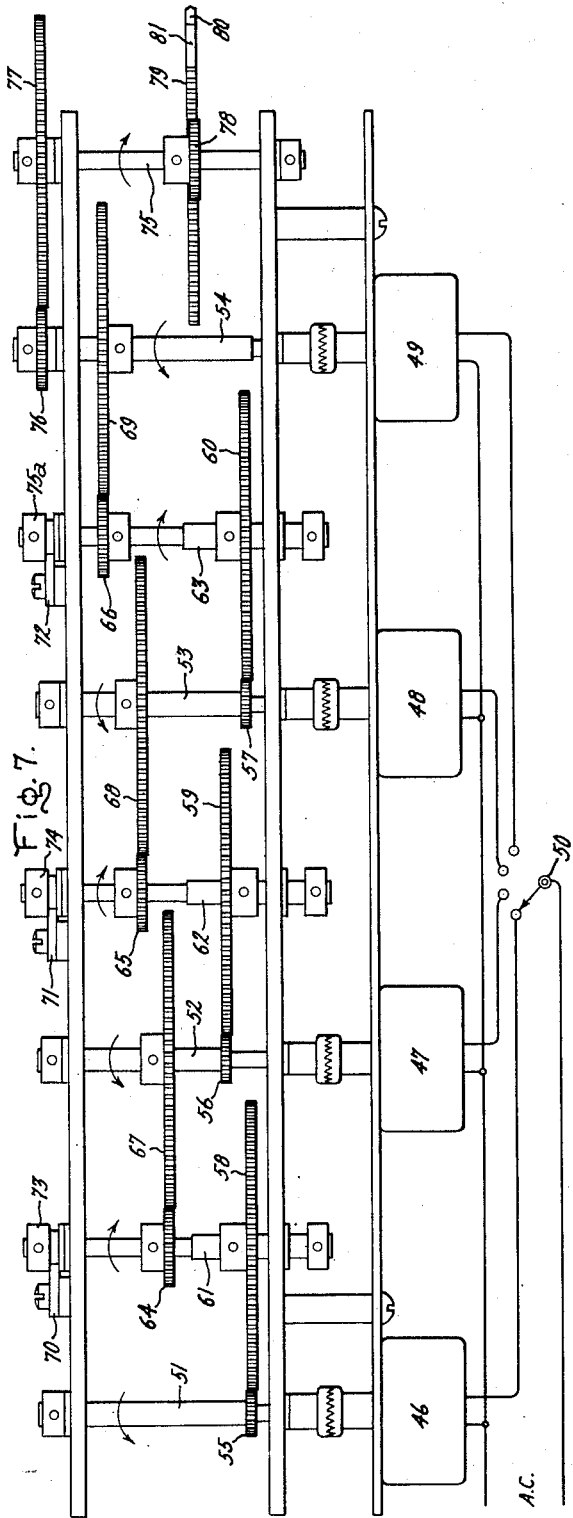

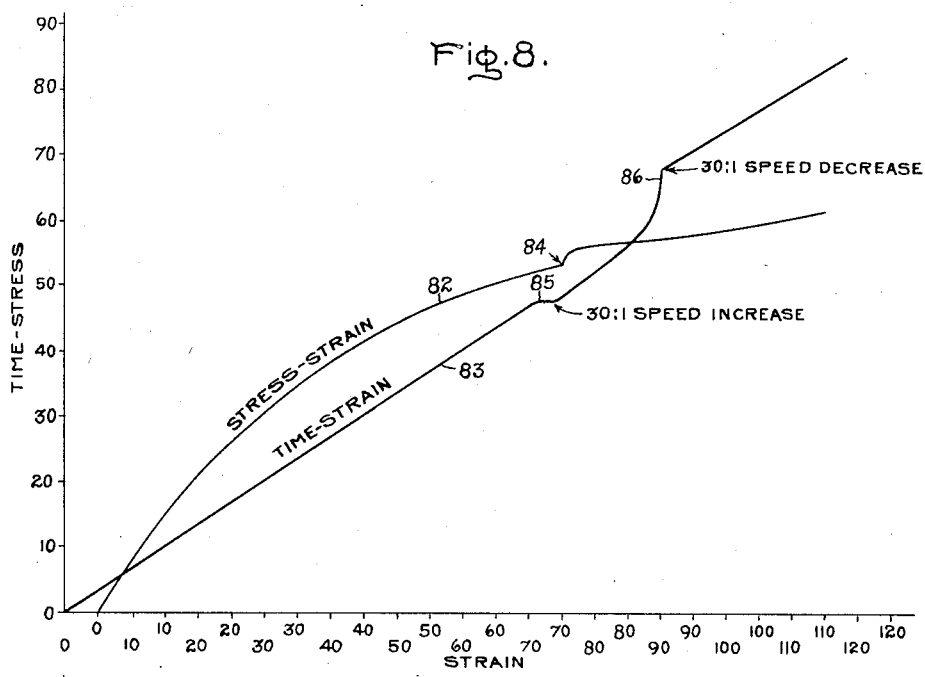
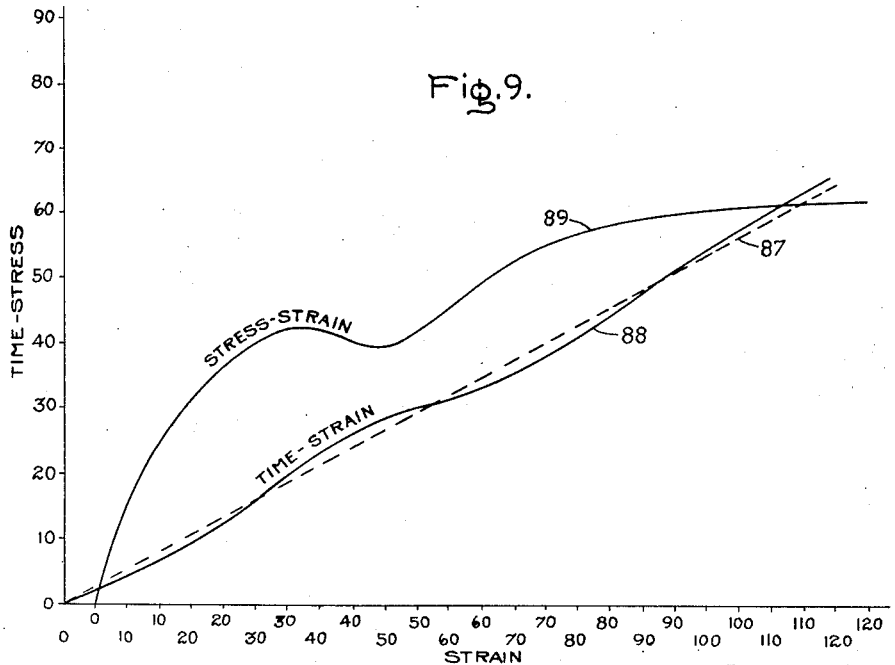

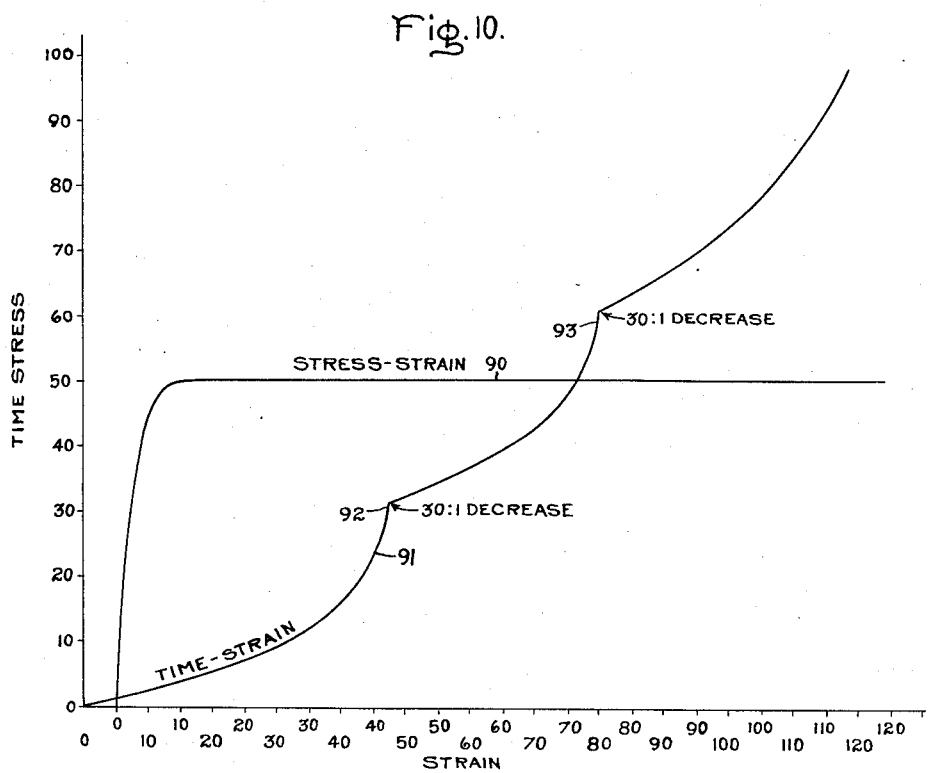

Nov. 17, 1953                J. D. LUBAHN                2,659,232
              APPARATUS FOR MAKING STRESS-STRAIN TESTS
Filed May 27, 1949                                 8 Sheets-Sheet 6
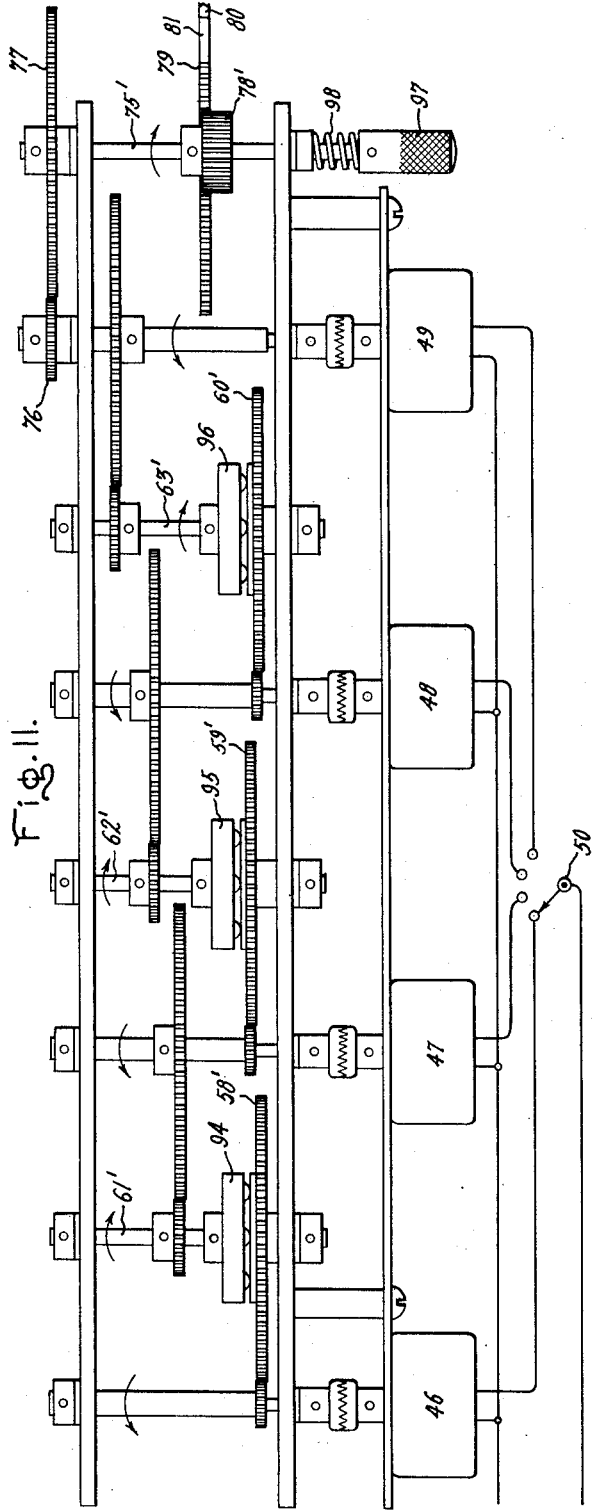
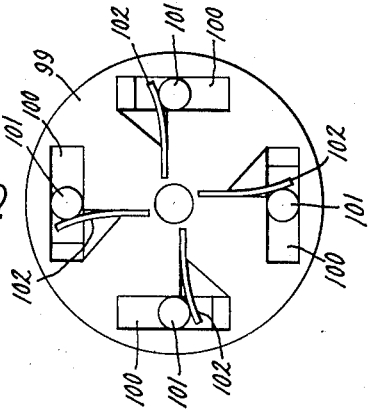
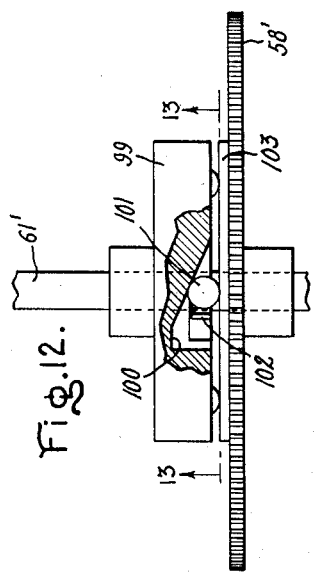
Inventor:
Jack D. Lubahn,
by Richard E. Holey
His Attorney.

Nov. 17, 1953            J. D. LUBAHN            2,659,232
APPARATUS FOR MAKING STRESS-STRAIN TESTS
Filed May 27, 1949            8 Sheets-Sheet 7
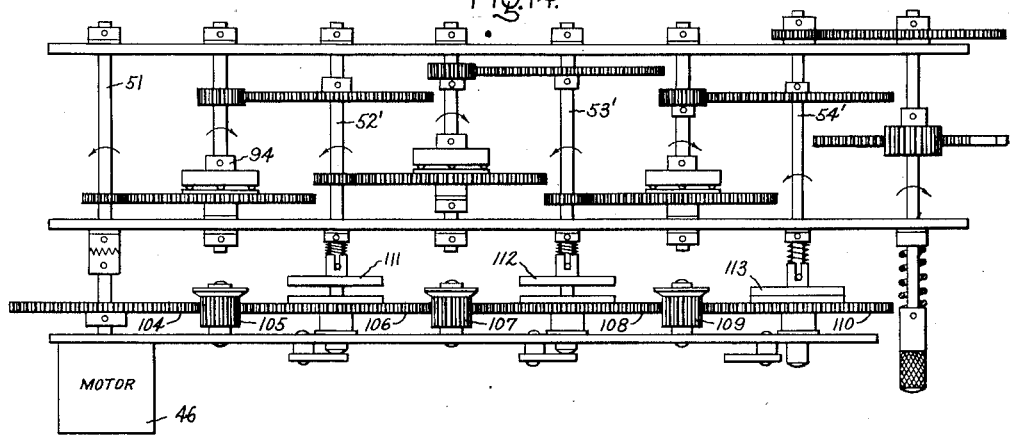
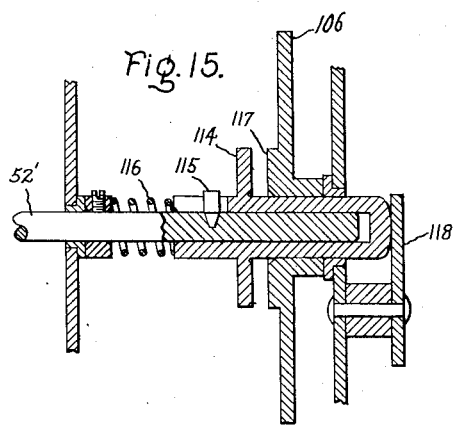
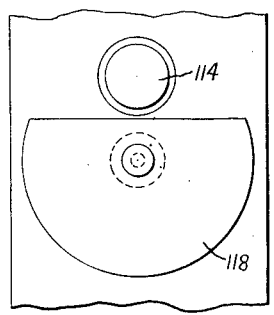
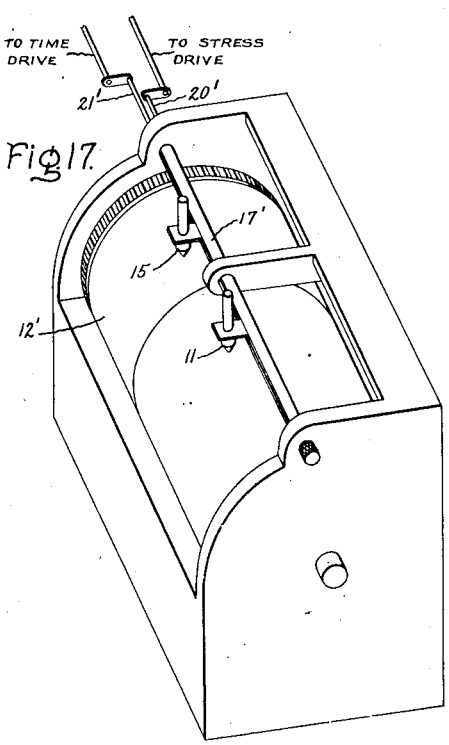
Inventor:
Jack D. Lubahn,
by Richard E. Holey
His Attorney.

Nov. 17, 1953  J. D. LUBAHN  2,659,232
APPARATUS FOR MAKING STRESS-STRAIN TESTS
Filed May 27, 1949  8 Sheets-Sheet 8

Inventor:
Jack D. Lubahn,
by Richard E. Haley
His Attorney.

Patented Nov. 17, 1953

2,659,232

UNITED STATES PATENT OFFICE 2,659,232

APPARATUS FOR MAKING STRESS-STRAIN TESTS

Jack D. Lubahn, Schenectady, N. Y., assignor to General Electric Company, a corporation of New York Application May 27, 1949, Serial No. 95,816

7 Claims. (Cl. 73—89)

This invention relates to improvements in apparatus for testing materials, and in particular to apparatus whereby the stress versus strain and the rate of strain of a test specimen of the material are recorded simultaneously.

Testing machines have previously been built with recorders for automatically recording the stress vs. strain characteristic of a test specimen. However, particularly in making tests at elevated temperatures, the stress-strain curves so obtained have sometimes shown discrepancies and transient phenomena which could not be satisfactorily explained, because the instantaneous rate of strain of the test specimen could not be determined.

At comparatively low temperatures, exact values depending upon the particular metal, large variations in strain rate have relatively little effect upon the strength of the material indicated by the stress-strain curve. Consequently, rate-of-strain is generally not taken into consideration when making tests at or near room temperature. But at elevated temperatures, the strength of metals varies greatly with relatively small variations in the rate of strain. For example, at 20° C. there is an increase of about 5% in the strength of an iron specimen when the strain rate is increased by a factor of 10,000; at 500° C. the strength of iron doubles when the strain rate is increased by a factor of 10.

An object of this invention is to provide means for simultaneously recording the stress vs. strain and the rate of strain of a test specimen, so that the instantaneous rate of strain at any point on the stress-strain curve can readily be determined.

Another object of this invention is to provide an improved rate-of-strain recorder which covers an extremely large range of strain rates.

Another object is to provide a rate-of-strain recorder having means for quickly making large changes in scale to facilitate measurement of large, sudden changes in the rate of strain.

Another object is to provide apparatus using a single electric strain gauge attached to the test specimen for recording stress vs. strain and rate of strain simultaneously on the same chart.

Other objects and advantages will become apparent as the description proceeds.

Figure 2:
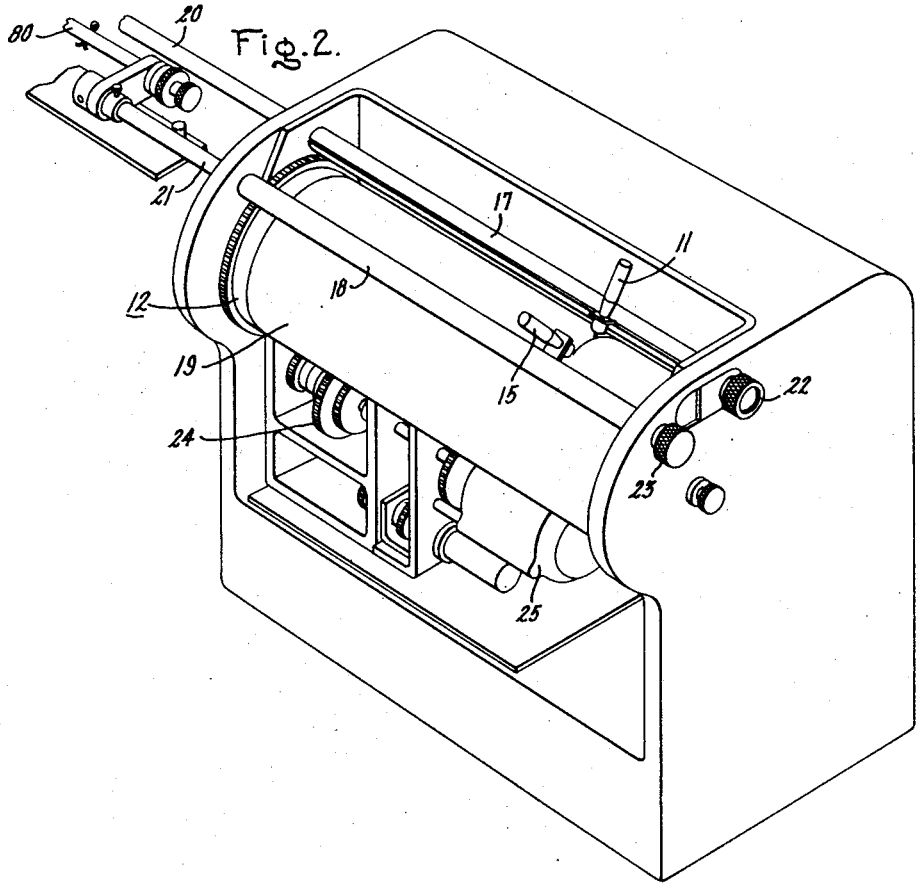
Figure 18:
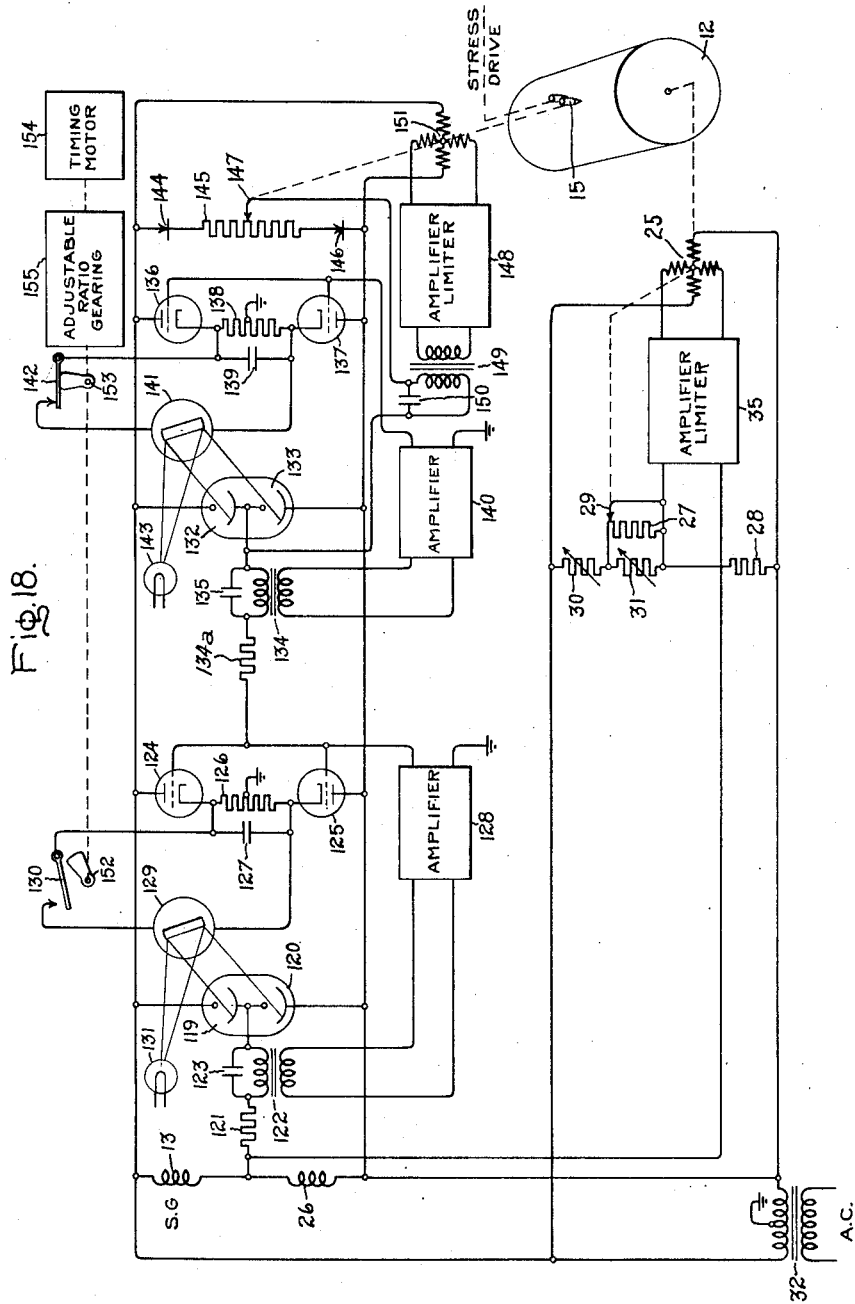

For a better understanding of the invention, reference is made in the following description to the accompanying drawings in which Fig. 1 is a schematic diagram of a testing machine and recorder for simultaneously recording stress vs. strain and rate of strain; Fig. 2 is a perspective view of the recorder chart drum and pens; Fig. 3 is a schematic diagram of one type of strain drive apparatus; Fig. 4 is a schematic diagram of one type of stress drive apparatus; Fig. 5 is a perspective view of a preferred form of time drive apparatus; Fig. 6 is a schematic view showing the arrangement of gears in the apparatus of Fig. 5; Fig. 7 is a developed view of the gear train in the apparatus of Fig. 5; Figs. 8, 9, and 10 are examples of curves made with the apparatus described; Fig. 11 is a developed view of the gear train of an alternative time drive apparatus; Fig. 12 is a view partly in section, of one form of overrunning clutch which may be used in the apparatus of Fig. 11; Fig. 13 is a view along the line 13—13 of Fig. 12; Fig. 14 is a developed view of the gear train of another alternative time drive apparatus; Fig. 15 is a section of one type of clutch mechanism which may be used in the apparatus of Fig. 14; Fig. 16 is a front view of the retaining washer of the clutch shown in Fig. 15; Fig. 17 is a perspective view showing an alternative arrangement of the recorder drum and pens; and Fig. 18 is a schematic diagram of apparatus for recording rate of strain or ordinates vs. strain as abscissae. Where the same part or a corresponding identical part appears in more than one figure of the drawings it is represented in each figure by the same reference numeral. Primes follow reference numerals representing modified parts in alternative embodiments.

Referring now to Fig. 1, a test specimen 1 is fastened between cross heads 2 and 3 of a testing machine which may be any of various types known in the art. As an example, a hydraulically operated machine is shown. Cross-head 3 is initially adjusted to a convenient position, and remains stationary during the test. Oil under pressure is supplied by oil pump 4 through valve 5 to a hydraulic press comprising piston 6 and cylinder 7. Valve 5 regulates the rate at which oil enters the hydraulic press. As the oil enters the press, piston 6 is forced upward. This in turn forces crosshead 2 upward and applies tensile load to test specimen 1.

Below cylinder 7 is a pressure capsule 8, which comprises a closed chamber filled with oil. The lower member of this chamber is connected to crosshead 3, and hence is pulled upward with a force equal to the tensile load applied to the test specimen. The initial weight of these parts is balanced by springs. Thus, the pressure of the oil within the capsule is proportional to the tensile load of test specimen 1. This pressure is transmitted through tube 9 to stress drive apparatus 10, hereinafter described, which translates a trace producing apparatus which in the present embodiment of the invention comprises a writing member 11 across a two-dimensional recording medium comprising a chart on the chart-supporting surface of recorder drum 12. Member 11 is translated along one dimension of the chart in the direction of the drum axis by amounts related to the increase in pressure within the pressure capsule, and hence to the stress applied to test specimen 1.

An electric strain gauge 13 is attached to the test specimen so that the distance between gauge points changes as the test specimen is strained. In turn, these changes produce changes in the electrical impedance of the strain gauge. Strain drive apparatus 14, hereinafter described, responds to changes in impedance in the electric strain gauge and rotates recorder drum 12 by amounts related to the strain of test specimen 1 to thereby cause the member 11 to move along the remaining dimension of the chart in a direction transverse to the axis of drum 12. The combined movements of writing member 11 and drum 12 cause writing member 11 to trace a stress-strain curve on the chart.

The recorder has a second trace producing apparatus which likewise comprises a writing member 15 spaced a short distance around the drum from member 11. Writing member 15 is translated across the chart-supporting surface of the drum along one dimension thereof in the direction of the drum axis by time drive apparatus 16, hereinafter described and is translated along the remaining dimension of the chart in common with member 11 in a direction transverse to the drum axis. The combined movements of writing member 15 and drum 12 cause writing member 15 to trace on the chart a curve the slope of which is a function of the rate of strain.

Refer now to Fig. 2, which shows in detail one arrangement of the writing members and recorder drum. Writing members 11 and 15 may, for example, be pens of conventional design. These pins have supports which ride within slots in tubes 17 and 18, respectively. The tubes are arranged parallel to the axis of the drum 12, so that the pens can move laterally across a chart 19, which is supported by the surface of the drum. Motion is transmitted to the pens by rods 20 and 21, respectively, which extend inside tubes 17 and 18. Rod 20 is connected to the stress drive apparatus, and rod 21 is connected to the time drive apparatus. Knurled nuts 22 and 23 are provided at one end of tubes 17 and 18, so that the tubes may be turned about their axis to lift the pens from the surface of the chart.

Drum 12 is rotated through speed reducing gears 24 by a motor 25 which is part of the strain drive apparatus.

The strain drive apparatus may be of a type used on testing machines, already known in the art, which record stress vs. strain of the test specimen. One type of strain drive apparatus is illustrated in Fig. 3.

Referring now to Fig. 3, strain gauge 13 is connected in one branch of an A. C. bridge circuit. An inductor 26 is connected in another branch of the circuit in series with gauge 13. 13 and 26 may be two coils of a single strain gauge, so constructed that when strain is applied the impedance of one coil increases while the impedance of the other decreases, or inductor 26 may simply be a coil which has about the same value of inductance as strain gauge 13. It may be desirable, especially when making tests at elevated temperatures, to have gauge 13 and inductor 26 located near each other and constructed so that both are affected in the same manner by temperature changes.

The other two legs of the bridge comprise a variable impedance element 27 and a fixed impedance element 28, which may be resistors as illustrated. Whenever the impedance of strain gauge 13 changes due to strain of the test specimen, the impedance of element 27 is varied as hereinafter described, to bring the bridge back into balance. Thus the position of movable tap 29 on impedance element 27 is related to the strain of the test specimen. Since indications are obtained with the bridge circuit always in balance, the effects of variations in supply voltage and other external factors are minimized.

The variable impedance elements 30 and 31, connected in series and in parallel, respectively, with impedance element 27, are provided for calibration purposes. Their use will be evident to those skilled in the art. The secondary of a transformer 32 is connected across gauge 13 and inductor 26 in series, to energize the bridge circuit. The primary of transformer 32 may be connected to any convenient source of alternating current, such as a commercial 60 cycle outlet. Preferably, the transformer secondary has a center tap connected to ground.

The output of the bridge is obtained between terminal 33 located at the junction of strain gauge 13 and inductor 26, and terminal 34 located at the junction of impedance element 27 and impedance element 28. The bridge output is applied through suitable connections to the input of an amplifier-limiter 35, which provides at its output an amplified error signal having the characteristics hereinafter described.

Motor 25 is a two phase induction motor. One set of its windings is connected across the secondary of transformer 32 and is thereby energized directly from the A. C. supply. The second set of windings is connected to the output of amplifier-limiter 35, and is energized in phase quadrature with the first windings, either leading or lagging, depending upon the direction of bridge unbalance. Therefore, the motor rotates at a speed which depends upon the amplitude of the amplifier-limited output, and in a direction which depends upon the phase of the amplifier-limiter output relative to the A. C. supply. The motor is connected through speed reduction gears to drum 12 and to movable tap 29.

Since the phase, relative to the A. C. supply, of the output from amplifier-limiter 35 is dependent upon the direction of unbalance of the bridge circuit, and since the direction in which motor 25 runs depends upon this phase, motor 25 can be connected to move tap 29 in such a direction that the bridge is always brought back into balance. At balance, the amplitude of the error signal drops to zero and rotation of motor 25 stops. Since drum 12 is rotated at the same time that tap 29 is moved, the angular position of the drum is related to the position of tap 29, and hence to the strain measured by strain gauge 13.

For small error signals, corresponding to small amounts of bridge unbalance, amplifier-limiter 35 produces an output which is proportional to its input. Thus, as the bridge approaches balance, the current supplied to motor 25 is gradually reduced. This reduces the speed of the motor as balance is approached, so that the motor will not overshoot. However, in order to obtain a quick balance, the gain of the amplifier is adjusted so that sufficient current is supplied to operate motor 25 at full speed whenever the bridge is unbalanced by more than a small amount. Since it would be undesirable to supply more current than this to the motor when the bridge is unbalanced by greater amounts, the amplifier is provided with a limiter so that no more current than is necessary for full speed operation of the motor is supplied at any time.

The stress drive may be any one of several types already known in the art, used with testing machines having stress-strain recorders. One type is illustrated in Fig. 4.

Referring now to Fig. 4, pressure in the pressure capsule of the testing machine is transmitted through tube 9 to a Bourdon gauge 36. An air compressor 37 supplies compressed air through a pressure regulating valve 38, which smooths out pressure fluctuations due to the compressor, to a bellows 39 and a jet nozzle 40. Covering the tip of the nozzle is a vane 41 which is connected to the end of Bourdon gauge 36, so that as the gauge straightens the vane is pulled away from nozzle 40. Also attached to vane 41 is a spring 42 which tends to pull the vane back against the nozzle opening. The other end of spring 42 is attached to a guided, vertically movable assembly which includes a rack 43. This assembly is attached to the top of bellows 39. Springs 44 attached to an arm on the guided assembly balance the bulk of the upward force due to the air pressure in the bellows. Rack 43 is connected through gears 45 to actuate a rack attached to rod 20, which moves pen 11 across the chart-supporting surface of drum 12 responsive to movement of rack 43.

The apparatus is in equilibrium when exactly the same amount of air escapes through nozzle 40 as passes through valve 38. When the tensile load applied to the test specimen is increased, the pressure in the pressure capsule of the testing machine rises, which tends to straighten the tube of Bourdon gauge 36. This pulls vane 41 away from jet 40, and allows more air to escape. Consequently, the pressure inside bellows 39 is reduced and the bellows is collapsed by the force applied by springs 44. Rack 43 moves downward as the bellows collapses, which increases the tension in spring 42, until the tension of this spring is just sufficient to pull vane 41 back to an equilibrium position. Since the elastic limit of spring 42 is not exceeded, its elongation, and hence the movement of rack 43, is proportional to the tensile load applied to the test specimen. Movement of rack 43 moves pen 11, and the pen produces a graphical record of stress vs. strain on the chart.

Refer now to Figs. 5, 6, and 7, which show a preferred form of the time drive apparatus. Fig. 5 is a perspective view of the assembled time drive apparatus; Fig. 6 is a schematic diagram showing the arrangement of gears in the apparatus of Fig. 5; and Fig. 7 is a developed view which best illustrates the operation of the apparatus. Referring particularly to Fig. 7, the time drive apparatus is operated by four synchronous electric motors 46, 47, 48, and 49. Each of these motors may be energized selectively from a suitable source of alternating current through switch 50. When energized, each motor runs at a constant speed which may, for example, be a speed of 4 revolutions per minute.

Four drive shafts 51, 52, 53, and 54, are coupled to the four motors respectively, so that when each motor is energized its associated drive shaft is rotated at a speed of 4 revolutions per minute. Small gears 55, 56, and 57 are attached to and rotate with drive shafts 51, 52, and 53 respectively. The small gears respectively mesh with larger gears 58, 59, and 60 which are attached to intermediate shafts 61, 62, and 63. Also attached to the intermediate shafts are small gears 64, 65, and 66 which mesh with larger gears 67, 68, and 69, respectively, attached to drive shafts 52, 53, and 54. The drive shafts are thus geared together so that each drive shaft may drive the next drive shaft at a slower speed. Preferably, the speed ratio between each drive shaft and the next drive shaft connected to it is 30 to 1. This ratio is obtained if gears 55 and 56, and 57 have a ⅜" pitch diameter; gears 58, 59, and 60 have a 3" pitch diameter; gears 64, 65, and 66 have a ¾" pitch diameter; and gears 67, 68, and 69 have a 2⅜" pitch diameter.

Each of the intermediate shafts 61, 62, and 63 is slidable along its axis so that its gears may be brought into engagement or disengagement selectively with their respective meshing gears. In Fig. 7 all of the intermediate gears are shown in their engaged position. These shafts are held in the engaged position by washers 70, 71, and 72, which fit into slots on collars 73, 74, and 75a attached to respective ones of the intermediate shafts. Each of the washers has one of its sides cut away, so that it may be turned to a position where it does not engage the slot of its associated collar. The shaft may then be slid along its axis to bring its gears into the disengaged position. When this is done the two adjacent driving shafts are disconnected from each other.

Shaft 54 drives a shaft 75 through two meshing gears 76 and 77, respectively attached to the two shafts. Attached to shaft 75 is a gear 78 which meshes with a rack 79. Rack 79 is attached through rod 80 to rod 21, Fig. 2, and thereby to pen 15. A backing roller or guide 78a is provided to hold rack 79 in engagement with gear 78, as shown in Fig. 5.

When all of the gears are engaged and motor 46 is energized, shaft 51 is rotated by the motor at a speed of 4 R. P. M. Through the gearing, shaft 52 is driven 1/30 as fast as shaft 51; shaft 53 is driven 1/30 as fast as shaft 52; and shaft 54 is driven 1/30 as fast as shaft 53. Shaft 54 drives shaft 75, and thereby moves rack 79 from right to left. This in turn moves pen 15, Fig. 2, laterally across the chart in the direction of the recorder drum axis.

When shaft 61 is moved to the disengaged position and motor 47 is energized, shaft 52 is rotated at a speed of 4 R. P. M. This is 30 times as fast as shaft 52 was driven when motor 46 was energized; and consequently rack 79 is moved to the left 30 times as fast as previously. In the same manner, the speed of rack 79 may be increased by an additional factor of 30 by moving shaft 62 to the disengaged position and energizing motor 48; and may be increased by another factor of 30 by moving shaft 63 to the disengaged position and energizing motor 49.

It will be appreciated that the time drive apparatus described provides a very wide range of speeds at which pen 15 may be moved across the chart surface. Furthermore, this speed may be quickly changed by a factor 30 simply by sliding the appropriate intermediate shaft to the engaged or the disengaged position and turning switch 50 to energize the proper motor. The advantage of being able to make these large speed changes quickly will become apparent as the description proceeds.

Smaller speed changes may be made by changing gears 76 and 77. For example, as illustrated in Fig. 7 gear 76 is a small gear which may have a ¾" pitch diameter, while gear 77 is a much larger gear which may have a 3" pitch diameter. With this gear combination, shaft 75 is driven one-fourth as fast as shaft 54. If gears 76 and 77 are interchanged—that is, if the 3/4″ gear is attached to shaft 75 and the 3″ gear is attached to shaft 54—shaft 75 will be driven at four times the speed of shaft 54. Thus a speed change of 16 to 1 is effected by interchanging the two gears. Other speed ratios may be obtained by using gears having different pitch diameters. The following table shows five gear combinations which provide speed ratios of shaft 75 to shaft 54 of from 4 to 1 to 1 to 4, each ratio differing from the preceding ratio by a factor of two.

| Gear Combination | Pitch Diameter | | Speed Ratio |
|---|---|---|---|
| | Gear 77 | Gear 76 | |
| | Inches | Inches | |
| 1 | 3/4 | 3 | 4/1 |
| 2 | 1 1/4 | 2 1/2 | 2/1 |
| 3 | 1 7/8 | 1 7/8 | 1/1 |
| 4 | 2 1/2 | 1 1/4 | 1/2 |
| 5 | 3 | 3/4 | 1/4 |

It may be noted that only six gears are required to make these five combinations.

Gear 78 should be of such size that when gear combination 1 is used and motor 49 is energized, pen 15, Fig. 2, will be moved across the chart surface at the maximum rate of speed desired. For example, if a chart having 120 divisions is used, it is very convenient to have pen 15 travel the full distance in twelve seconds at maximum speed. For a ten inch chart, this requires that gear 78 have a pitch diameter of approximately one inch. The rate of travel is then ten divisions per second, which is a convenient number to use. This rate of travel will generally be fast enough to use with the fastest test ordinarily run with a testing machine. The following table, which shows the time required for full scale travel with various motors energized and with various gear combinations, illustrates the wide range of strain rates which can be measured with this time drive apparatus.

*Time required for full scale travel*

| Motor No. | Gear Combination | | | | | |
|---|---|---|---|---|---|---|
| | 1 | 2 | 3 | 4 | 5 | |
| 49 | 12 | 24 | 48 | 96 | 192 | Seconds. |
| 48 | 6 | 12 | 24 | 48 | 96 | Minutes. |
| 47 | 3 | 6 | 12 | 24 | 48 | Hours. |
| 46 | 3 3/4 | 7 1/2 | 15 | 30 | 60 | Days. |

Overtravel of the pen after full scale movement is prevented by providing a slightly cutaway portion 81 at the end of rack 79. When the pen has moved the full-scale distance, gear 78 runs off the end of rack 79 into cut-away portion 81, whereupon further rotation of the gear produces no movement of the rack.

To reset the pen to its initial or zero position, shaft 63 is moved to the disengaged position and all four motors are de-energized. It is then possible to move manually either the pen itself or gear 77 to restore the pen to its zero position.

Refer now to Fig. 8, which illustrates a set of curves plotted automatically by the apparatus which has been described. The horizontal, or strain, axis represents distance around recorder drum 12, Fig. 2, and the vertical axis represents distance across the chart in the direction of the drum axis. It may be noted that two curves are plotted on the same chart. Curve 82, which represents stress vs. strain, is drawn by pen 11, while curve 83, which represents time vs. strain, is drawn by pen 15. Note that the two curves are slightly displaced from each other along the strain axis, due to the necessity for spacing the pens slightly apart so that they may move independently of each other. However, if this space is made exactly equal to an integral number of chart divisions, it is easy to locate corresponding points on the two curves and little difficulty is caused by their relative displacement. In Fig. 8 the top row of figures along the strain axis represents strain values applicable to the stress-strain curve, while the bottom row of figures represents strain values applicable to the time-strain curve. Numerals along the vertical axis represent stress values for the stress-strain curve, and time values for the time-strain curve.

At the beginning of a test both writing members are at the right-hand end of the recorder drum, Fig. 2, which corresponds to the zero position on Fig. 8. The recorder drum is in its zero strain position, so that pen 11 is adjacent zero in the upper row of figures along the strain axis, Fig. 8, and pen 15 is adjacent zero in the bottom row of figures. In order to simultaneously energize all of the component parts of the apparatus, electric energy is simultaneously applied to oil pump 4 of the hydraulic stressing mechanism, the stress drive apparatus 10, and the time drive apparatus 16 from a power supply source (shown schematically in Fig. 1) through a suitable control switch. As the test proceeds, stress is applied to the test specimen and pen 11 is moved across the chart by amounts proportional to such stress. As the stress is applied, strain of the test specimen occurs, and the recorder drum rotates by amounts proportional to the strain. As a result stress-strain curve 82 is traced upon the chart. Simultaneously, pen 15 is moved across the chart by the time drive apparatus, and time-strain curve 83 is traced upon the chart. The speed of the time drive is adjusted so that curve 83 is neither too horizontal nor too vertical for changes in its slope to be easily measured. The slope of curve 83 is inversely proportional to the rate of strain of the test specimen, and consequently the rate of strain corresponding to any point on the stress-strain curve can be determined by noting the slope of the time-strain curve at the corresponding strain value.

During the test, the rate of strain of the test specimen may change greatly, and these changes may be very sudden. The changes may be either deliberate or accidental. For example, at point 84 on curve 82, the rate of strain was deliberately increased by changing the oil valve setting of the testing machine. This was done so that the transient response of the metal to a sudden change in strain rate could be observed. The trainsient begins with a sharp rise in the stress-strain curve at point 84. At the corresponding point 85 on curve 83, the time-strain curve becomes almost horizontal, which shows that the rate of strain has been increased greatly. To determine just what the new rate of strain is, it is necessary to expand the time axis of the chart. This is done by changing from one motor to another in the time drive apparatus to provide a 30 to 1 increase in the speed of travel of pen 15. After such an increase, the slope of the time-strain curve may have an easily measurable value as illustrated, or a further scale expansion of 30 to 1 may be necessary. As the test progresses, there may be an accidental change in strain rate, possibly due to changes within the metal tested. For example, the strain rate may return to a lower value, and the time-strain curve may then become almost vertical, as at point 86. When this occurs, a 30 to 1 speed decrease can be used to facilitate measurement of the new strain rate.

It will be appreciated from the example just given that the provision for quickly making speed changes in the order of 30 to 1 is a considerable advantage. The smaller speed changes provided by changing gears 76 and 77 are not so important, because it is always possible to secure an acceptable slope, between 0.18 and 5.5 approximately, of the time-strain cuve with the 30 to 1 speed changes.

Refer now to Fig. 9, which is another set of curves prepared by the apparatus which has been described, which illustrate another use of the apparatus. In this case it was desired that the strain rate should be maintained throughout the test as nearly as possible at a constant predetermined value. Before the test, line 87 was drawn on the chart with a slope corresponding to the desired strain rate. The test was then run, and during the test the operator manually adjusted the oil inlet valve of the testing machine to make time-strain curve 88 follow curve 87 as closely as possible. Because of the speed with which accidental rate of strain changes may occur, it was not possible for the operator to maintain precisely the desired strain rate throughout the test, as is shown by the fact that curve 88 does not follow line 87 perfectly. However, curve 88 does provide a record of exactly what the true strain rate was at all times during the test. The chart thus shows the unintentional variations in strain rate, which may cause effects in stress-strain curve 89 which could not be properly interpreted if it were assumed that the strain rate was actually maintained at the constant desired value.

Refer now to Fig. 10, which shows a set of curves traced by the apparatus described during a creep test in which the stress applied to the test specimen was maintained at a constant value during the horizontal portion of stress-strain curve 90. Time strain curve 91 shows that at the beginning of the test the rate of strain was relatively great, and gradually decreased until at point 92 the time-strain curve was almost vertical. At this point the speed of the time drive was decreased by a factor of 30, so that the time-strain curve again had an acceptable slope until point 93 was reached, at which point the strain rate had decreased to such a low value that curve 91 was again almost vertical. So the speed was decreased again by a factor of 30.

Refer now to Fig. 11, which illustrates an alternate form of time drive apparatus. This apparatus is similar to that shown in Fig. 7, except that intermediate shafts 61', 62', and 63' are not slidable to disengage their gears. Instead, overrunning clutches 94, 95, and 96 perform the engaging and disengaging functions. In this embodiment, gears 58', 59', and 60' are not rigidly fastened to their shafts, but are free to turn about the shafts except as they are restrained by the overrunning clutches. The clutches are so arranged that each of these gears will turn to the left relative to its shaft, but cannot turn to the right relative to its shaft. Since the intermediate shafts and their gears always rotate to the right, the effect is that the gears can never rotate faster than the shafts and will transmit torque to the shafts, but the shafts can rotate faster than the gears and will not transmit torque to the gears. For example, when motor 46 is energized, it will transmit torque in the decreasing-speed direction through the entire gear train to shaft 75', and thus will move rack 79 as hereinbefore explained. When motor 47 is energized, it will transmit torque through the gear train in the decreasing-speed direction, and will move rack 79 thirty times as fast as it was moved by motor 46. However, torque will not be transmitted through the gear train in the increasing-speed direction, since the tendency will be for shaft 61' to rotate faster than gear 58', and therefore overrunning clutch 94 will disengage the shaft from the gear. Thus, all that is necessary to change the speed of the time drive apparatus by a factor of 30 is to move switch 50 one position to the right for a speed increase, or to the left for a speed decrease. With this modification the speed changes can be made very rapidly and conveniently.

Another feature of this embodiment of the invention is the means for resetting the pen to its zero position. This is done by pressing in on reset knob 97, which slides shaft 75' over until gear 77 is disengaged from gear 76. Preferably gear 78' is made wide enough so that it remains engaged with rack 79. Then by turning knob 97, the pen can be moved to its zero position. When knob 97 is released, a spring 98 forces shaft 75' back to its original position in which gear 77 is engaged with gear 76.

Refer now to Figs. 12 and 13, which illustrate one form of overrunning clutch which may be used in the apparatus of Fig. 11. Member 99 of the clutch is attached to shaft 61 and always rotates with the shaft. On the inner face of member 99 there are a plurality of recessed portions 100, shaped substantially as shown. Within each recessed portion is a ball 101 which is urged toward the shallow end of the recess by a spring 102. These balls come in contact with clutch plate 103, which is firmly attached to a gear such as gear 58'. When the gear has a tendency to rotate faster than the shaft each ball is thereby forced further into the shallow part of its recess, and thereby grips clutch plate 103 firmly, and prevents any substantial rotation of gear 58' to the right relative to the shaft 61. However, when the tendency is for the shaft to rotate faster than the gear, balls 101 are thereby forced into the deeper part of their recess, loosen their grip on clutch plate 103, and permit the shaft to rotate to the right relative to the gear. It will be appreciated that other types of overrunning clutch may be used with this invention, such as the known sprag types and the spring-friction types.

Refer now to Fig. 14, which shows an alternative time drive apparatus operated by a single synchronous electric motor. Motor 46 is connected to rotate shaft 51 in the manner hereinbefore described. Driving shafts 52', 53', and 54' are connected to shaft 51 through a gear train comprising gears 104, 105, 106, 107, 108, 109, and 110, and clutches 111, 112, and 113, as shown. When the clutches are engaged they respectively connect gear 106 to shaft 52', gear 108 to shaft 53', and gear 110 to shaft 54'. When the clutches are disengaged the gears rotate freely without transmitting torque to the shafts. When all three clutches 111, 112, and 113 are disengaged, the time drive apparatus operates at its slowest speed in the same manner as in apparatus shown in Fig. 11. When clutch 111 is engaged, shaft 52' is driven through gears 104, 105, and 106 at the same speed as shaft 51; and the time drive apparatus operates at 30 times the speed of operation with all clutches disengaged. Overrunning clutch 94 automatically disengages the 30 to 1 ratio gearing between shafts 51 and 52', and thus prevents binding of the gears. Similarly, when clutch 112 is engaged shaft 53' is driven at the same speed as shaft 51, and when clutch 113 is engaged shaft 54' is driven at the same speed as shaft 51. Thus any of the 30 to 1 speed changes can be produced simply by engaging or disengaging the proper clutches. It may be noted that the speed of operation is determined by the last clutch toward the right which is engaged, and that it is immaterial whether the preceding clutches are engaged or disengaged. For example, when clutch 113 is engaged, as shown in Fig. 14, the time drive operation is at its fastest speed, whether clutches 111 and 112 are disengaged, as shown, or engaged.

Refer now to Figs. 15 and 16, which show in detail one type of clutch which may be used for clutches 111, 112, and 113, Fig. 14. Referring particularly to Fig. 15, clutch member 114 is slidably mounted on the end of a driving shaft, for example, shaft 52'. Member 114 has a slot which engages a key 115 which is attached to the driving shaft, so that the shaft and member 114 always rotate together, although the clutch member may slide axially along the shaft. In the engaged position of the clutch, a spring 116 forces member 114 snugly against a clutch plate 117 which is attached to or a part of a gear, for example, gear 106. Thus when the clutch is engaged the gear is connected in driving relation to the shaft so that the two rotate together.

The clutch is disengaged by pressing against the outer end of member 114 to slide this member along the shaft away from contact with clutch plate 117. Gear 106 then rotates freely, independent of shaft rotation. A washer 118 is provided which fits over the end of member 114 to hold the clutch in its disengaged position against the tension of spring 116.

Refer now to Fig. 16, which is a front view of washer 118 and shows its construction. One side of washer 118 is cut away as shown, so that the washer can be turned selectively to a position where it holds member 114 in the disengaged position, or can be turned to a position where the cutaway portion of the washer permits member 114 to move outward to the engaged position.

Refer now to Fig. 17, which shows an alternate arrangement of the pens on the recording drum. Drum 12' is somewhat longer than the recording drum shown in Fig. 2, and the chart which the drum supports is divided into two sections. The stress-strain curve is recorded on the lower section of the chart, while the time-strain curve is recorded on the upper section. The two writing members are in line, so that corresponding points on the two curves lie one directly above the other, and the same strain units apply to both curves. Rods 20' and 21', which are respectively attached to the two pens, extend inside the same tubular member 17', which accordingly must be somewhat larger than the tubular members 17 and 18, Fig. 2, each of which contains but a single rod.

Refer now to Fig. 18, which is a schematic diagram of an alternative rate-of-strain recorder in which pen 15 is translated laterally across the chart by amounts related to the rate of strain, instead of at a predetermined time rate. With this embodiment, the ordinate instead of the slope of the curve obtained represents the rate of strain. This makes it easier to read rate-of-strain values from the chart, but the apparatus which must be employed is somewhat more complex.

In this embodiment the strain drive apparatus which rotates recorder drum 12 by amounts related to strain of the test specimen may be identical to that shown in Fig. 3 and hereinbefore described.

Phototubes 119 and 120 in series are connected in parallel with strain gauge 13 and inductor 26, with their polarities such that both phototubes are conducting during the same half-cycle of alternating current, and both are non-conducting during the other half-cycle. Phototubes 119 and 120 may be the two halves of a twin phototube contained in a single envelope, as illustrated in the drawing. Preferably the phototubes are of the vacuum type having minimum conductivity in the reverse direction. A resistor 121 and the primary of a transformer 122 are connected in series between the junction of strain gauge 13 and inductor 26 and the junction of phototubes 119 and 120. Preferably, there is connected in parallel with the primary of transformer 122 a capacitor 123 which has the proper value of capacitance to tune the transformer primary to resonance at the fundamental frequency of the A. C. supply.

Two vacuum tubes 124 and 125 have their respective anodes connected to opposite ends of the secondary of transformer 32. The cathodes of these two vacuum tubes are connected together through cathode resistor 126, which has a center tap connected to ground. Preferably a capacitor 127 is connected in parallel with resistor 126 as shown.

The secondary of transformer 122 is connected to the input of an amplifier 128. One output terminal of amplifier 128 is connected to ground; the other output terminal is connected to the grids of vacuum tubes 124 and 125.

A fluxmeter galvanometer 129, preferably of the type described in U. S. Patent 2,356,608, issued to L. O'Bryan and assigned to the same assignee as this application, is connected in series with a switch 130 across resistor 126. This galvanometer is positioned so that light from a lamp 131 is reflected from the mirror of the galvanometer to phototubes 119 and 120, in such a way that the relative illumination of the two phototubes depends upon the angular position of the galvanometer mirror.

Two additional phototubes 132 and 133 in series are connected across the secondary of transformer 32 in the same way that phototubes 119 and 120 are connected. The primary of a transformer 134 is connected between the junction of phototubes 132 and 133 and the grids of vacuum tubes 124 and 125. Preferably a capacitor 135 is connected in parallel with the primary of 134 to tune the transformer primary to resonance at the fundamental frequency of the alternating current source. The impedance of the transformer primary should be high compared to the impedance of the phototubes, or an additional impedance element 134a may be placed in series with the transformer primary, as shown.

Vacuum tubes 136 and 137 have their respective anodes connected to opposite ends of the secondary of transformer 32. The cathodes of vacuum tubes 136 and 137 are connected together through cathode resistor 138 which has a grounded center tap. Preferably a capacitor 139 is connected in parallel with resistor 138.

The secondary of transformer 134 is connected to the input terminals of an amplifier 140. One output terminal of amplifier 140 is connected to ground, and the other is connected to the grids of vacuum tubes 136 and 137.

A fluxmeter galvanometer 141 is connected in series with a switch 142 across resistor 138. This galvanometer is positioned to reflect light from a lamp 143 to phototubes 132 and 133, so that the relative illumination of the two phototubes depends upon the angular position of the galvanometer mirror.

A rectifier 144, an impedance element 145, and a rectifier 146 are connected in series in the order stated across the secondary of transformer 32. The rectifiers have their polarities arranged so that both are conducting during the same half-cycle of alternating current that phototubes 132 and 133 are conducting, and are non-conducting during the other half-cycle.

Impedance element 145 has an adjustable tap 147. This tap and the junction of phototubes 132 and 133 are connected to the input of an amplifier-limiter 148, preferably through a transformer 149. A capacitor 150 may be connected in parallel with the primary of transformer 149 to tune the transformer primary to resonance at the fundamental frequency of the alternating current source. Amplifier-limiter 148 may have the same characteristics as amplifier-limiter 35, hereinbefore described.

A two-phase induction motor 151 is connected through suitable speed reducing gears, not shown, in driving relation to pen 15 and movable tap 147. The output terminals of amplifier-limiter 148 are connected to one set of the windings of motor 151; the other set of the motor's windings are connected across the secondary of transformer 32.

Switches 130 and 142 are normally open, but each is closed periodically by cams 152 and 153 operated by timing motor 154 through adjustable ratio gearing 155.

The principle of operation of this recorder is that successive strain values, taken a predetermined time interval apart, are compared, and the difference between successive values is used as a measure of the rate of strain.

The relation between the impedance of strain gauge 13 and the impedance of inductor 26 depends upon the amount of strain of the test specimen, as hereinbefore explained. During the half-cycle when the phototubes conduct, the relation of the impedance of phototube 119 to the impedance of phototube 120 depends upon the relative illumination of the phototubes, and hence upon the mirror position of galvanometer 129. If during this half-cycle the impedance ratio of phototubes 119 and 120 is the same as the impedance ratio of strain gauge 13 and inductor 26, no current will flow through resistor 21 and the primary of transformer 122, because during this half-cycle the voltage division across the two phototubes is exactly the same as the voltage division across strain gauge 13 and inductor 26. During the half-cycle when the phototubes are non-conducting, it is evident that no appreciable current can flow through the resistor and the transformer primary, since the current cannot flow through either phototube.

However, if during the half-cycle when the phototubes conduct their impedance ratio is not the same as the impedance ratio of strain gauge 13 and inductor 26, current will flow through resistor 121 and the primary of transformer 122. This current will be a pulsating D. C., which will have an amplitude related to the degree of difference in the impedance ratios. This pulsating D. C. has a true D. C. component, a fundamental frequency A. C. component, and harmonic frequency components. For present purposes only the fundamental frequency component is of importance. This component is transmitted by transformer 122 with the greatest efficiency, since the primary of the transformer is tuned to resonance at the fundamental frequency, as has been explained.

The A. C. components of current through the primary of transformer 122 are amplified by amplifier 128 and applied to the grids of vacuum tubes 124 and 125. When there is no alternating current through transformer 122, tubes 124 and 125 conduct equally, and their cathodes are at the same D. C. potential. However, if the impedance ratio of strain gauge 13 to inductor 26 is greater than the impedance ratio of phototube 119 to phototube 120, a fundamental frequency component of voltage is applied to the grid of tube 124, which is in phase with the anode voltage of this tube. This increases the conduction of tube 124. The same fundamental frequency component is applied to the grid of tube 125, but in this case the grid voltage is in phase opposition to the anode voltage, so that tube 125 conducts a lesser amount of current. This causes a difference in voltage drop across the two halves of resistor 126, and makes the cathode of tube 124 positive with respect to the cathode of tube 125. If the impedance ratio of strain gauge 13 to inductor 26 is smaller than the impedance ratio of phototube 119 to phototube 120, the fundamental frequency current through transformer 122, and hence the fundamental frequency voltage applied to the grids of vacuum tubes 124 and 125, is reversed in phase. In this case tube 125 conducts more current than tube 124, and the cathode of tube 124 becomes negative with respect to the cathode of tube 125.

Whenever there is a difference in D. C. potential between the cathode of tube 124 and the cathode of tube 125, and when switch 130 is closed, a current flows through fluxmeter galvanometer 129. The fluxmeter galvanometers have the characteristic that when current flows through the galvanometer the mirror rotates in a direction depending upon the direction of current, and when current flow stops, the mirror stops rotating and remains in its last position. The suspension torque of these instruments is compensated so that there is no tendency of the mirror to return to any particular position in the absence of current.

The current flowing through galvanometer 129 due to a difference in D. C. potential between the cathodes of tubes 124 and 125 rotates the galvanometer mirror and thus changes the relative illumination of phototubes 119 and 120. This change in illumination changes the impedance ratio of the two phototubes. When this impedance ratio has been changed sufficiently that it is the same as the impedance ratio between strain gauge 13 and inductor 26, there is no further current flow through transformer 122, and the conduction of vacuum tubes 124 and 125 becomes equal. Therefore there is no further current flow through galvanometer 129, and rotation of the galvanometer mirror ceases.

From the above description it is evident that this part of the circuit is in effect an A. C. bridge circuit which will automatically rebalance itself whenever switch 130 is closed. This rebalancing action can be very rapid, since the only moving parts are the moving elements of galvanometer 129, which are very light and have low inertia. In addition, these moving parts move by a very slight amount to rebalance the bridge, and the error signal available for rebalancing is relatively large, since it is amplified by amplifier 128.

When switch 130 is open, the bridge does not rebalance itself, and the amplified error signal which is the output of amplifier 128 is related to the change in impedance of strain gauge 13 during the time interval since the bridge was last rebalanced. The strain gauge should be designed to have a strain-impedance characteristic such that the amplitude of the error signal is always substantially proportional to the changes in strain. If the strain gauge characteristic is linear, it may be desirable to insert an additional impedance element in series with gauge 13 so that the percentage changes in impedance of the bridge arms is small.

Phototubes 132 and 133, vacuum tubes 136 and 137, amplifier 140 and fluxmeter galvanometer 141 are parts of a similar self-balancing A. C. bridge circuit. When the output of amplifier 128 is zero, the grids of vacuum tubes 124 and 125 are at ground potential. If switch 142 is then closed, galvanometer 141 will move to adjust the impedance ratio of phototubes 132 and 133 until the junction of these phototubes is also at ground potential. If there is an output signal from amplifier 128 when switch 142 is closed, the impedance ratio of phototubes 132 and 133 will be adjusted to such a value that the fundamental frequency voltage of their junction is equal to and in phase with the voltage output of amplifier 128.

If the impedance ratio of the two sides of impedance element 145 is the same as the impedance ratio of phototube 132 to phototube 133, there will be no fundamental frequency current through the primary of transformer 149. However, if there is a difference in these impedance ratios, there will be a fundamental frequency current through transformer 149 which will have an amplitude and phase dependent upon the degree and direction of the difference in the two ratios. This current provides an error signal which is amplified by amplifier-limiter 148 and applied to one set of windings of motor 151. This causes motor 151 to rotate and move tap 147 in the proper direction to make the two impedance ratios equal.

Now, suppose timing motor 154 drives cams 152 and 153 at a speed of one revolution per second. Then once each second switches 130 and 142 are closed. For example, suppose that switch 130 is closed for the first one-sixth of each second, that both switches are open for two-thirds of each second, and that switch 142 is closed for the last one-sixth of each second. When switch 130 is closed, a galvanometer 129 brings the impedance ratio of phototubes 119 and 120 into equality with the impedance ratio of strain gauge 13 and inductor 26. Both switches then remain open for two-thirds of a second. At the end of this time there is a fundamental frequency output from amplifier 128 which is related to the change in impedance of strain gauge 13 during the preceding two-thirds second. At this point switch 142 is closed, and galvanometer 141 adjusts the impedance ratio of phototubes 132 and 133, so that the fundamental frequency voltage at the junction of these two phototubes is equal to the output voltage of amplifier 128. Switch 142 is then opened, switch 130 is closed, and the cycle is repeated. Thus the fundamental frequency voltage at the junction of phototubes 132 and 133 is adjusted once each second to a value related to the change in impedance of strain gauge 13 during two-thirds of the preceding second. Motor 151 in turn maintains the position of tap 147 such that the impedance ratio across impedance element 145 is likewise a function of the change in strain gauge impedance during two-thirds second intervals, and hence is related to the rate of strain of the test specimen. Since movement of pen 15 is proportional to movement of tap 147, the pen traces a rate-of-strain curve on the chart.

In this embodiment of the invention a change of scale may be effected by changing the length of the time cycle for the closing of switches 130 and 142. For example, the gear ratio of adjustable ratio gearing 155 may be changed by a factor of 30, so that switches 130 and 142 are closed once each 30 seconds instead of once each second. This produces a 30 to 1 expansion of the rate of strain scale on the chart.

It will be evident to those skilled in the art that numerous modifications of this apparatus are possible without departing from the principles employed. For example, switches 130 and 142 could be replaced with relays, either mechanical or electronic, which could be operated at the proper times by various different types of timing mechanisms.

Having described the principles of this invention and the best mode in which I have contemplated applying those principles, I wish it to be understood that the apparatus described is illustrative only, and that other means can be employed without departing from the true scope of the invention.

What I claim as new and desire to secure by Letters Patent of the United States is:

1. In combination with a testing machine for determining the stress-strain characteristics of a test specimen, a drum having a chart-supporting surface, means to rotate said drum by amounts related to the strain of the test specimen, a first writing member, means to translate said first writing member across the chart-supporting surface in the direction of the drum axis by amounts related to the stress applied to the test specimen, a second writing member, means to translate said second writing member across the chart-supporting surface in the direction of the drum axis at a predetermined time rate, and means for simultaneously actuating the first and second writing member translating means in response to actuation of the testing machine.

2. In combination with a testing machine for determining the stress-strain characteristics of a test specimen, a drum having a chart-supporting surface, means to rotate said drum by amounts related to the strain of the test specimen, a first writing member, means to translate said first writing member across the chart-supporting surface in the direction of the drum axis by amounts related to the stress applied to the test specimen, a second writing member, a constant-speed motor, means including an adjustable-ratio gear train connected in driven relation to said motor and in driving relation to said second writing member to translate the second writing member across the chart-supporting surface in the direction of the drum axis at a predetermined time rate, and means for simultaneously actuating the first and second writing member translating means in response to actuation of the testing machine.

3. In combination with a testing machine for determining the stress-strain characteristics of a test specimen, a drum having a chart-supporting surface, means to rotate said drum by amounts related to the strain of the test specimen, a first writing member, means to translate said first writing member across the chart-supporting surface in the direction of the drum axis by amounts related to the stress applied to the test specimen, a second writing member, means to translate said second writing member across the chart-supporting surface in the direction of the drum axis by amounts related to the rate of strain of the test specimen, and means for simultaneously actuating the first and second writing member translating means in response to actuation of the testing machine.

4. In combination with a testing machine for determining the stress-strain characteristics of test specimens, a two-dimensional recording medium, first and second trace producing apparatus cooperating with said recording medium for producing traces on the recording medium at any point in a desired two-dimensional area thereof, means coacting with the trace producing apparatus for effecting movement of both the trace producing apparatus in common relative to the recording medium along one dimension of the recording medium in accordance with the strain developed in the test specimen, means for simultaneously controlling the action of said first trace producing apparatus in the remaining dimension of the recording medium in accordance with the stress applied to the test specimen, means for simultaneously controlling the action of said second trace producing apparatus in the remaining dimension at a predetermined time rate, and means for simultaneously actuating the first and second trace producing apparatus controlling means in response to actuation of the testing machine.

5. In combination with a testing machine for determining the stress-strain characteristics of test specimens, a two-dimensional recording medium, first and second writing members normally engaging the recording medium and adapted to be separately moved relative to the recording medium in either one of two opposite directions in either dimension thereof, means for moving said recording medium relative to both of said writing members in either direction of one dimension thereof in accordance with the strain developed in the test specimen, means for simultaneously moving said first writing member relative to the recording medium in the remaining dimension of the recording medium in accordance with the stress applied to the specimen, means for simultaneously moving said second writing member relative to the recording medium in the remaining dimension thereof at a predetermined time rate, and means for simultaneously actuating the first and second writing member moving means in response to actuation of the testing machine.

6. In combination with a testing machine for determining the stress-strain characteristics of test specimens, a two-dimensional recording medium, first and second writing members normally engaging the recording medium and adapted to be separately moved relative to the recording medium in either one of two opposite directions in either dimension thereof, means for moving said recording medium relative to both of said writing members in either direction of one dimension thereof in accordance with the strain developed in the test specimen, means for simultaneously moving said first writing member relative to the recording medium in the remaining dimension of the recording medium in accordance with the stress applied to the specimen, adjustable speed drive means connected in driving relation to said second-writing member for moving the same relative to the recording medium in the remaining dimension thereof at an adjustable time rate, and means for simultaneously actuating the first and second writing member moving means in response to actuation of the testing machine.

7. In combination with a testing machine for determining the stress-strain characteristics of test specimens, a two-dimensional recording medium, first and second trace producing apparatus cooperating with said recording medium for producing traces on the recording medium at any point in a desired two-dimensional area thereof, means coacting with the trace producing apparatus for effecting movement of both the trace producing apparatus in common relative to the recording medium along one dimension of the recording medium in accordance with the strain developed in the test specimen, means for simultaneously controlling the action of said first trace producing apparatus in the remaining dimension of the recording medium in accordance with the stress applied to the test specimen, and means for simultaneously controlling the action of said second trace producing apparatus at a rate related to the rate of strain of the test specimen, and means for simultaneously actuating the first and second trace producing apparatus controlling means in response to actuation of the testing machine.

JACK D. LUBAHN.

References Cited in the file of this patent

UNITED STATES PATENTS

| Number | Name | Date |
|---|---|---|
| 1,103,691 | Schuch | July 14, 1914 |
| 1,728,279 | Ramsey | Sept. 17, 1929 |
| 1,877,467 | Lake | Sept. 13, 1932 |
| 1,935,421 | Valentine | Nov. 14, 1933 |
| 2,014,357 | Klemperer | Sept. 10, 1935 |
| 2,153,317 | Sigo | Apr. 4, 1939 |
| 2,164,993 | Lewis | July 4, 1939 |
| 2,181,728 | Greentree | Nov. 28, 1939 |
| 2,198,040 | Peters | Apr. 23, 1940 |
| 2,362,589 | Simmons, Jr. | Nov. 14, 1944 |
| 2,496,420 | Stern | Feb. 7, 1950 |
| 2,555,633 | Comins | June 5, 1951 |
| 2,560,135 | Shearer | July 10, 1951 |

FOREIGN PATENTS

| Number | Country | Date |
|---|---|---|
| 541,203 | Great Britain | Nov. 17, 1941 |

OTHER REFERENCES

"Mechanical Testing" by Batson and Hyde (Chapman & Hall, Ltd.), vol. 1, pp. 154–155, 1922.

Electronics, "Strain Gages," December 1943, 73–88.5 pp. 106 et seq.